United States Patent

Kamp

[15] 3,636,844
[45] Jan. 25, 1972

[54] MECHANISM FOR USE IN A CAMERA FOR EXPOSING AND INITIATING THE PROCESSING OF PHOTOGRAPHIC UNITS

[72] Inventor: Leonard F. Kamp, Rochester, N.Y.
[73] Assignee: Eastman Kodak Company, Rochester, N.Y.
[22] Filed: June 17, 1970
[21] Appl. No.: 46,856

[52] U.S. Cl. ................................................95/13
[51] Int. Cl. ........................................G03b 17/50
[58] Field of Search ..................95/13, 14, 89 R, 89 A

[56] References Cited

UNITED STATES PATENTS 3,541,937  11/1970  Nerwin ...................................95/13
3,350,990  11/1967  Finelli et al. ..........................95/13
3,525,293  8/1970  Harvey ...................................95/13

Primary Examiner—Samuel S. Matthews
Assistant Examiner—Fred L. Braun
Attorney—Robert W. Hampton and D. Peter Hochberg

[57] ABSTRACT

A mechanism for transporting and initiating the processing of "self-processing" film units in a camera that exposes and effects the processing of such units. The mechanism includes a reciprocable carriage which moves in a first direction over an exposed unit to release and spread processing solution across the unit, and in a return direction to transport a fresh unit from a supply chamber into position for exposure, while ejecting the exposed unit from the camera. The carriage is guided by cooperating rails both to prevent the premature release of processing reagent on film units in the supply chamber, and to effect transporting engagement between the carriage and the fresh unit when the carriage is moved in the return direction.

8 Claims, 7 Drawing Figures

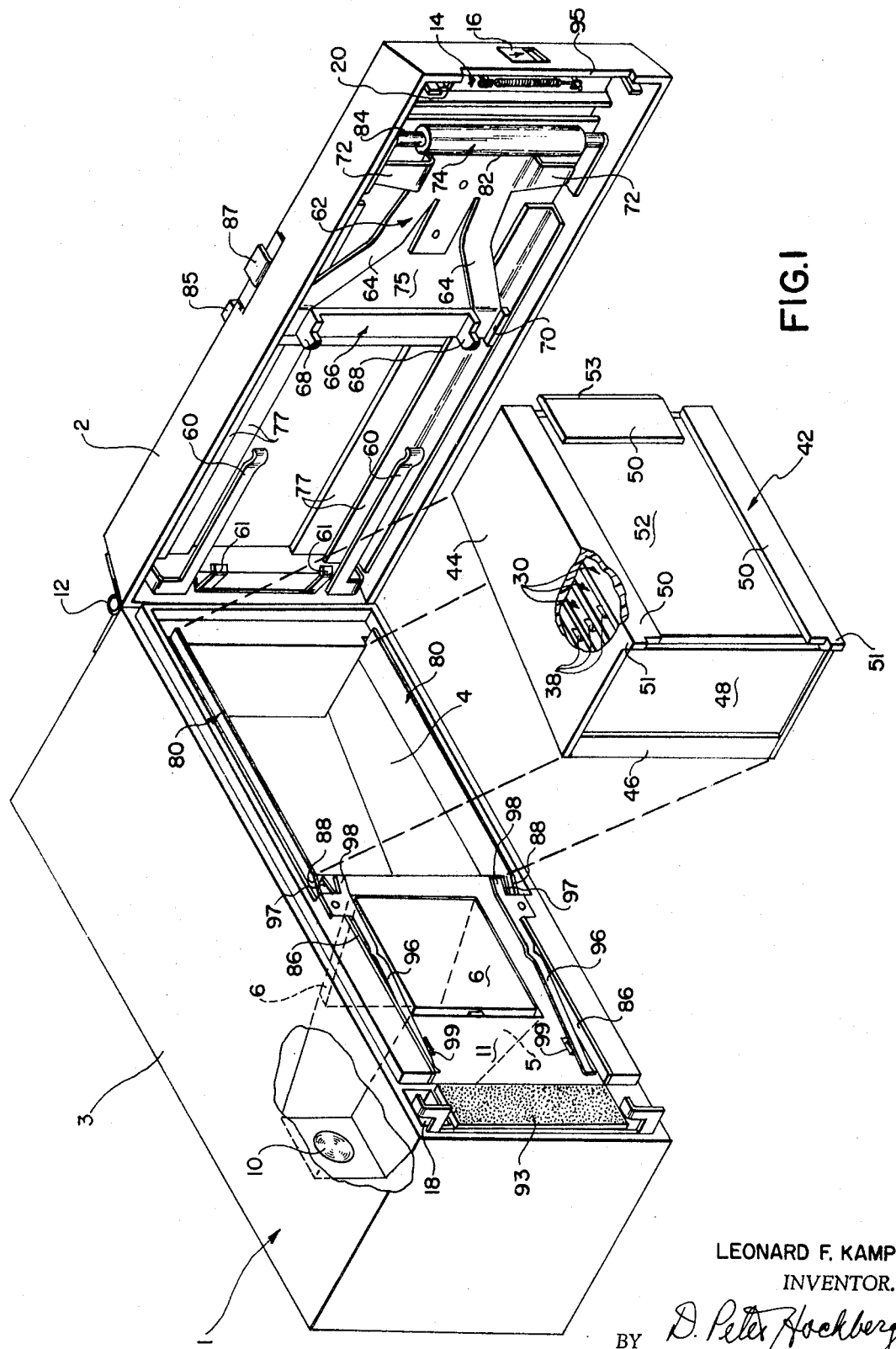

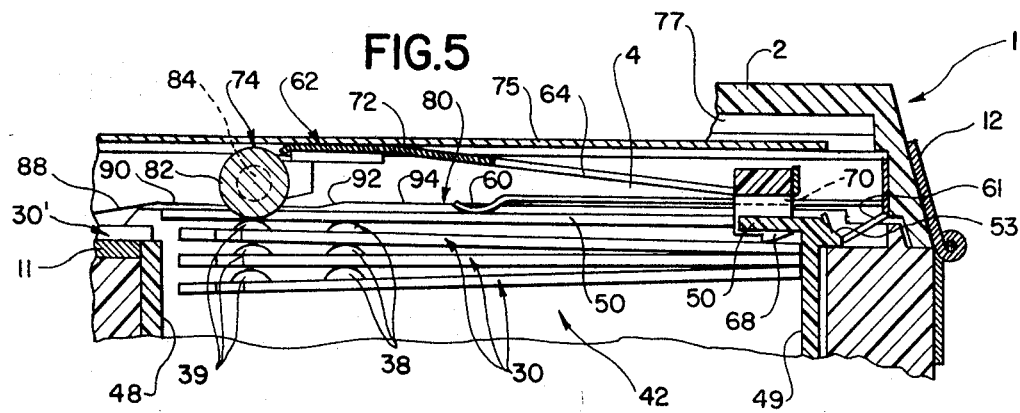
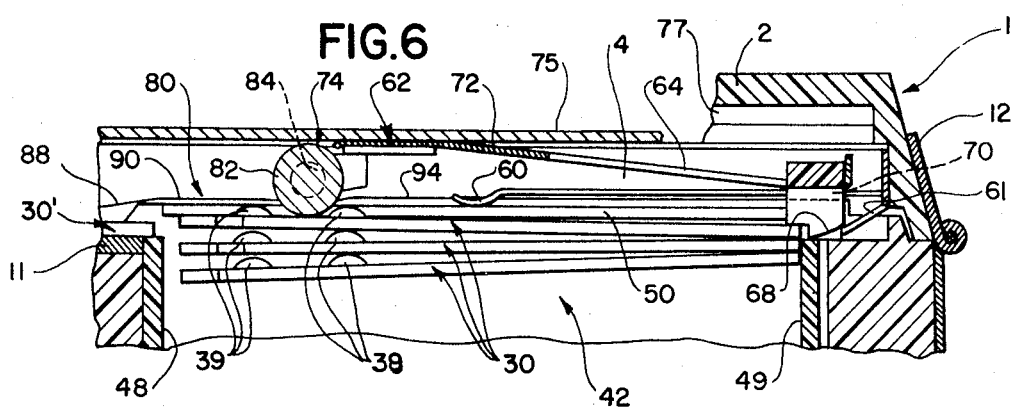
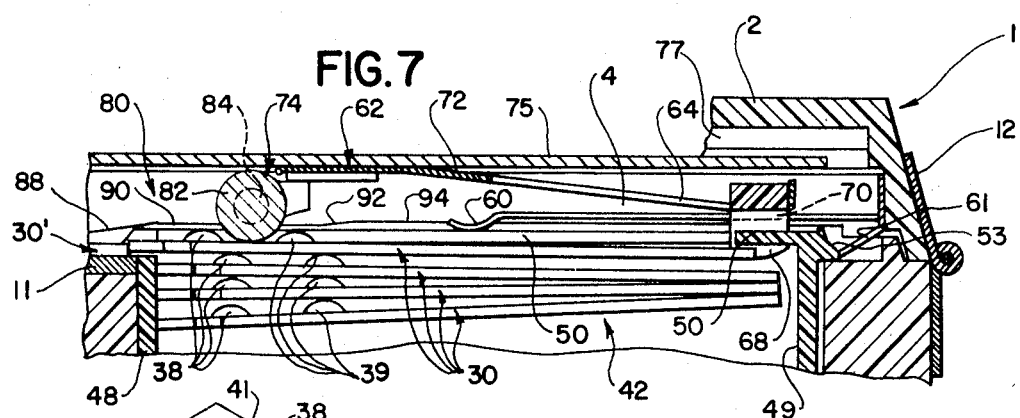
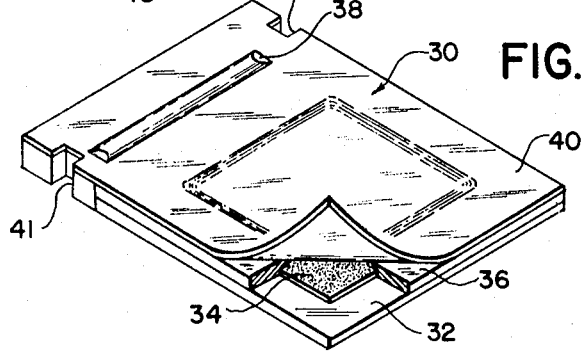
LEONARD F. KAMP
INVENTOR.
BY D. Peter Hochberg
Robert W. Hampton
ATTORNEYS

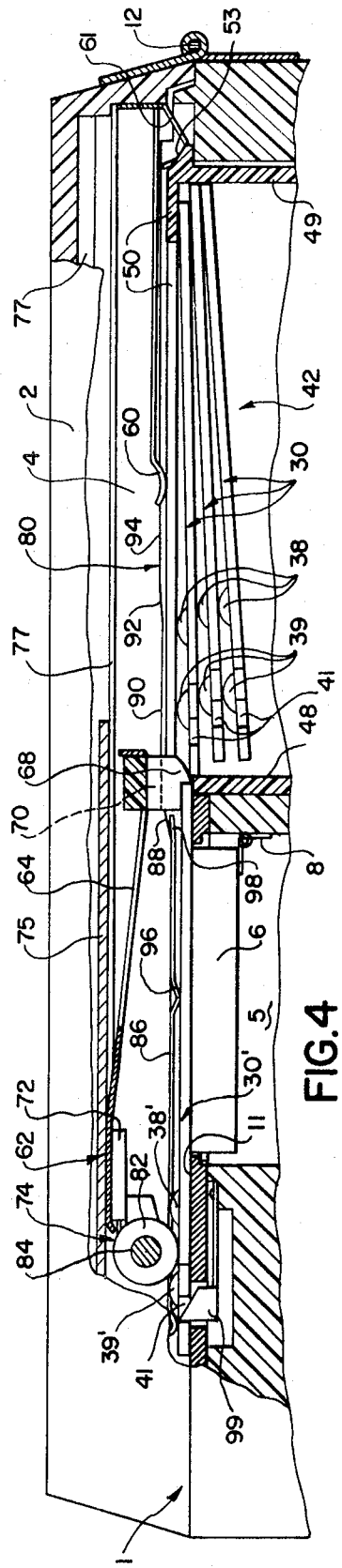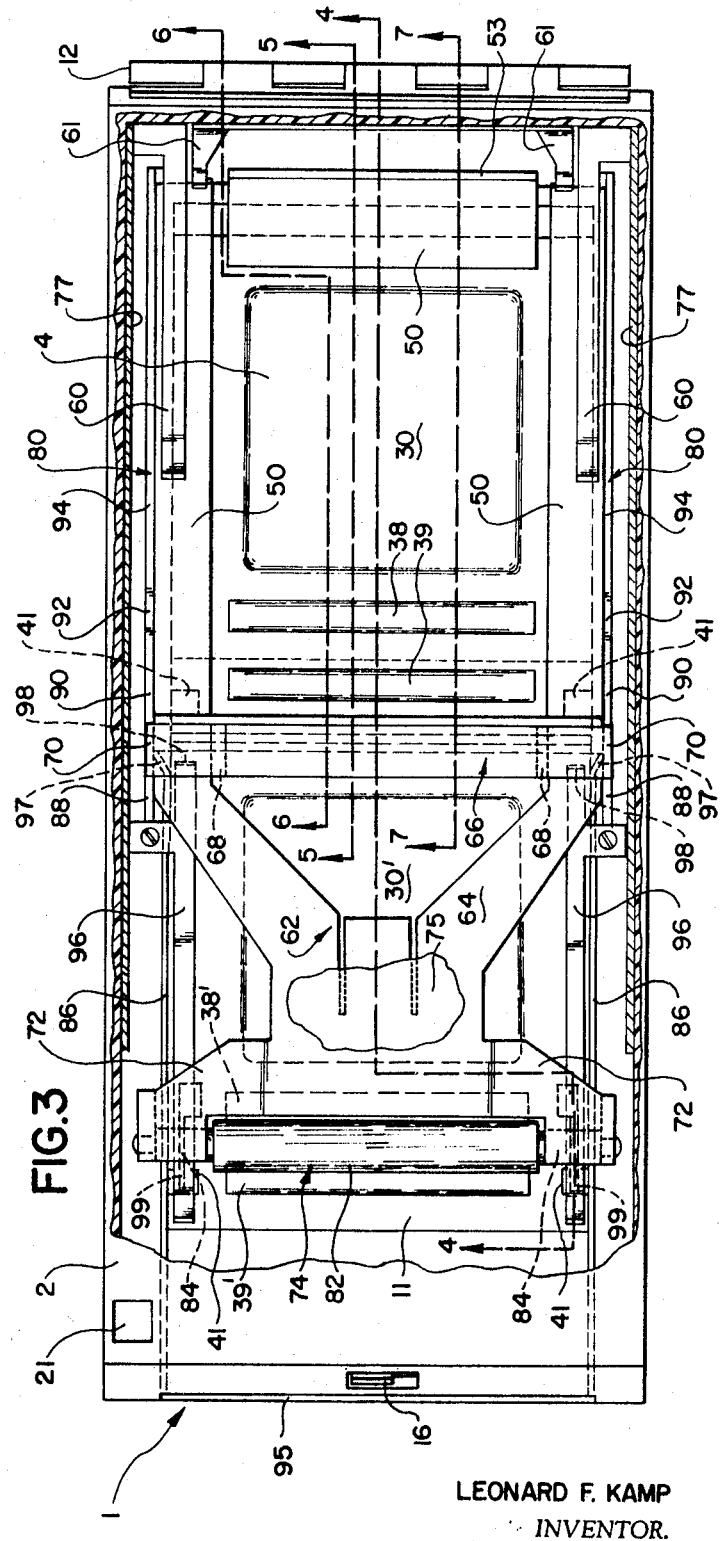

MECHANISM FOR USE IN A CAMERA FOR EXPOSING AND INITIATING THE PROCESSING OF PHOTOGRAPHIC UNITS

CROSS-REFERENCE(S) TO RELATED APPLICATION(S)

Reference is made to commonly assigned copending U.S. Pat. application Ser. No. 46,939, entitled "Reciprocating Ratchet Mechanism," filed of even date herewith in the name of Leonard F. Kamp.

BACKGROUND OF THE INVENTION

1. Field of the Invention

This invention relates to mechanisms for transporting and initiating the processing of "self-processing" film units in cameras for exposing and effecting the development of such units. The invention contemplates, but is not necessarily limited to, slide transparency units each comprising a photographic film element secured in a rigid mount, and one or more pods attached to the mount and containing processing reagents which, upon release and distribution over the film element, process the element into a finished transparency. More specifically, the present invention provides a mechanism for transporting or advancing film units in a camera, and for effecting the release and spreading of processing reagent over the exposed film element of such units to process the element.

2. Description of the Prior Art

Several mechanisms for accomplishing film transport and processing in "self-processing" cameras already are known in the art. U.S. Pat. No. 3,225,670 to M. Friedman et al., for example, discloses a system for producing a fully processing 35-mm. transparency unit. In that system, separate transparency units are loaded in an exposure chamber of a camera with leaders extending through a processing chamber and out of the camera. After exposure, transparency units are successively pulled into a development chamber, causing the rupturing of a pod to release processing fluid across the transparency. The finished transparency is obtained after an appropriate developing period by withdrawing the unit from the camera, and stripping waste material from the unit. Such a system has the disadvantage that either the wrong leader, or several leaders, might be pulled inadvertently, thereby spoiling the transparency units to which such leaders are attached, and possibly jamming the camera.

U.S. Pat. Nos. 3,369,470 (to Downey) and 2,873,658 (to Land) also exemplify known systems for exposing and effecting the processing of transparency units. In these cases, the units are supplied from a magazine aligned with the exposure aperture to be successively exposed and transported to a developing chamber. A mechanical slide mechanism drives exposed transparency units between a set of rollers to rupture a processing solution-carrying pod on the transparency unit, and into a developing chamber. Systems of this type also suffer from certain disadvantages. For example, the unit is moved only between substantially stationary rollers, and the system thus lacks the diversity of a system where one or more of the rollers may be moved over the unit. Moreover, since the transparency unit is moved between the rollers before further exposure to light, a separate takeup and processing chamber is required. Still further, the film supply is aligned with the exposure aperture, making it difficult to accurately align an individual film unit in the focal plane of the camera. Furthermore, to obtain a proper developing period, the processed units must be manually removed from the developing chamber, whereas mechanical means for delivering finished units often is preferable and permits the further refinement of a completely automatic system.

U.S. Pat. No. 3,350,990 (to Finelli et al.) discloses a reciprocable film-transporting assembly somewhat similar to the above-described types but additionally having ramps or cam guides for controlling the processing pressure-applying rollers. However, systems of this type still suffer from various disadvantages such as one or more of those set forth above. Moreover, even this system will not provide the various advantages of the subject invention as will be set forth hereinafter or will be apparent to those skilled in the art from the following description.

SUMMARY OF THE INVENTION

The present invention pertains to cameras for exposing and effecting the processing of film units, and to mechanisms in such cameras for transporting film units in the camera and for releasing and distributing processing reagents over an exposed film unit.

A mechanism according to a preferred embodiment is particularly adapted for use with cameras having a first or exposing and developing chamber, and a second or supply chamber. The film units preferably are transparency producing units supporting one or more pods of processing reagent which are adapted to be ruptured to release the reagent over the film.

In this preferred embodiment, operation of the mechanism causes it first to rupture a pod of processing reagent and to spread the reagent over an exposed film unit in the first camera chamber to initiate processing of the unit. Thereafter, the mechanism picks up a second unit and transports it from the second chamber into the first chamber, simultaneously displacing the processed transparency unit from the first chamber and out of the camera. In the situation where a fixing solution must be distributed over the developed transparency, a second pod can be provided adjacent the leading edge of the unit, and means such as are disclosed in copending U.S. Pat. application No. 675,597, entitled "Camera and Method for Exposing and Developing Slide Transparency Units," filed Oct. 16, 1967, in the name of Hubert Nerwin, now U.S. Pat. No. 3,541,937, can be provided at the camera exit for rupturing the latter pod and spreading the solution over the transparency as the unit leaves the camera. More specifically, the mechanism comprises a reciprocable carriage on which are mounted pod-rupturing elements such as a roller, and means for moving the carriage in one direction to rupture the pod on an exposed film unit in the first chamber and to spread processing reagent over the unit, and in a return direction to transport a second unit to the first chamber for exposure while expelling the exposed unit from the camera. The second unit is transported to the first chamber by a claw assembly on the carriage which engages and draws the fresh unit into the first chamber upon return of the carriage to its initial position. A set of rails and ramps guides the carriage first behind the first chamber to cause initiating of the processing of the transparency unit therein, and then behind the second chamber to engage the fresh unit without rupturing the pods on any units in the latter chamber. Although the first chamber has been described as an exposure chamber and the second chamber as a supply chamber, the invention is not restricted to this arrangement.

An object of the present invention is to provide an improved mechanism for transporting film units within a camera.

Another object is to provide an improved mechanism for initiating the processing of self-processing film units.

A further object of the present invention is to provide a camera for sequentially exposing and effecting the processing of exposed self-processing film units and for sequentially presenting fresh units to an exposure position.

Another object is the provision of a mechanism of the aforementioned type for effecting the rupturing of one or more pods of processing reagents on an exposed self-processing film unit, and for preventing the rupturing of such pods on unexposed units.

Another object is the provision of a simple and economical camera of the aforementioned type which is reliable and easy to operate.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings, in which:

FIG. 1 is a rear perspective view of a camera incorporating the present invention, with the camera door in an open position, and a film unit supply cartridge oriented for insertion into the camera supply chamber;

FIG. 2 illustrates a film unit with which the invention can be used;

FIG. 3 is a rear elevation view of the camera shown in FIG. 1 with portions cut away to more clearly reveal internal components thereof;

FIG. 4 is a sectional view of the camera of FIG. 1 taken through the line 4—4 in FIG. 3, and shows a carriage in accordance with the present invention in its initial position behind the film exposure chamber;

FIG. 5 is a section through the line 5—5 in FIG. 3, and depicts the carriage of the invention as it moves behind the film supply chamber of the camera to secure a fresh transparency unit for exposure;

FIG. 6 is a section through the line 6—6 in FIG. 3 showing a fresh transparency unit being urged into engagement with the claw of the carriage of the invention; and FIG. 7 is a section taken through the line 7—7 in FIG. 3, and illustrates the operation of the carriage of the invention to transport a fresh transparency unit into the exposure chamber to displace the exposed unit already positioned there.

DETAILED DESCRIPTION OF THE INVENTION

Because cameras are well known, the present description will be directed in particular to camera elements forming part of, or cooperating more directly with, apparatus in accordance with the present invention. It is to be understood that camera elements not specifically shown or described may take various forms well known to those skilled in the art.

Referring to FIG. 1, a camera 1 comprises a rear door 2, and a front portion 3. Front portion 3 includes a film unit supply chamber 4 and an exposure chamber 5 shown in dotted lines. A platen 6 is connected by a hinge 8 (FIG. 4) and is movable between a closed position as shown, and an open position shown in dotted lines. Included at the forward portion of exposure chamber 5 is a conventional objective lens 10 and a shutter (not shown). In order to make an exposure of a film unit platen 6 must be in its open position, and a film unit positioned across the rearward portion of chamber 5 and supported on a gate member 11 at the focal plane of the camera optical system. When door 2 is in its closed position, there is sufficient clearance between the forwardmost portion of door 2 and gate member 11 to permit the passage of film units from supply chamber 4 to the exposure position. As will be explained later, sufficient clearance is also provided for the movement of various operative elements mounted in door 2 across the rear part of front portion 3 of camera 1. Camera 1 also includes a hinge 12 by which door 2 is connected to the forward portion of camera 1, and a latch mechanism comprising elements in both the front portion and the door of camera 1 and designated broadly by the numeral 14. Latch 14 is of the type which locks the camera door in place when the door is moved to its closed position across the camera back, and which is released upon depression of operating knob 16 on the end of door 2. An eyepiece 18 of the camera viewfinder system is provided adjacent the portion of latch 14 on the front portion 3 of camera 1, and an opening 20 is accordingly provided in the portion of latch 14 on door 2 to enable the photographer to look through eyepiece 18 through an aligned opening 21 (FIG. 3) in door 2 when door 2 is closed. Other elements of camera 1 are to be discussed hereinafter.

Camera 1 is adapted for use with film units of the type indicated by the numeral 30 in FIG. 2. Film unit 30 comprises a rigid base 32 having an aperture therein over which is mounted a photosensitive film element 34, and a retaining portion 36 having an aperture therethrough which, when the unit is assembled, is aligned with the aperture in base 32 and across photosensitive element 34. Film unit 30 is of the "self-processing" type and includes a pod 38 containing processing reagents which is adapted to be ruptured to release the reagents across element 34 to effect the processing of the element and to thereby produce a finished transparency unit. A cover piece 40 is provided over the entire film unit, and is adapted to be peeled away after the unit has been exposed and processed to reveal a finished transparency unit. Pod 38 could be replaced by a plurality of pods which contain, for example, a developing solution and a fixing solution respectively, and which are adapted to be ruptured in sequence to effect the distribution of their contents across the film element. The nature of these reagents is not part of the present invention. A pair of opposed notches 41 are defined in the sides of unit 30 for engagement by appropriate camera structure to retain the unit in the exposure chamber as explained hereinafter.

Although supply chamber 4 of camera 1 shown in FIG. 1 could be adapted to receive film units 30 directly, supply chamber 4 is instead adapted to receive a cartridge 42 of the type disclosed in U.S. Ser. No. 685,618, filed Nov. 24, 1967 in the name of Leonard F. Kamp and entitled "Cartridge for Dispensing Slide Transparency Units" now U.S. Pat. No. 3,541,939. Cartridge 42 will be discussed only insofar as is necessary to fully describe the present invention, and reference is made to the cited application for a more detailed description of the cartridge. Cartridge 42 is adapted to receive a stack of transparency units 30 and to dispense them sequentially for exposure in camera 1. The cartridge includes a pair of opposed trapezoidal sidewalls 44 (sidewalls 44 being so-shaped to enable the cartridge to accommodate compactly pod-carrying transparency units 30), a cover 46, a large end wall 48 and a smaller opposing end wall 49 (FIG. 4), and a set of inwardly extending flanges 50 for retaining units in the cartridge. A freshly loaded cartridge includes a pressure plate at the forward portion of the cartridge which is urged by a spring towards flanges 50, a stack of transparency units 30 to the rear of the pressure plate, and a blank 52 for sealing the opening at the base of the cartridge between flanges 50 to prevent the fogging of the light-sensitive units held in the cartridge. Thus, in order to load camera 1, cartridge 42 containing film units 30, is inserted into supply chamber 4 of camera 1, and door 2 is closed, thus causing two pairs of leaf springs 60 and 61 attached to door 2 to engage the cartridge and urge cartridge-seating elements 51 and 53 against corresponding locating surfaces in camera 1. When cartridge 42 is seated, the exit opening from the cartridge is aligned with the surface of gate 11 so that slides have an unobstructed path to the film gate. After the withdrawal of blank 52, the film units are withdrawn in sequence from cartridge 42, and exposed and processed in the manner described below.

Referring now to FIGS. 1 and 3, a carriage 62 is provided for withdrawing fresh film units from cartridge 42 and for effecting the processing of previously exposed units. Carriage 62 comprises a pair of leaf spring support arms 64 which cooperatively support a claw member 66 having a pair of forwardly extending claws 68 depending therefrom, and a pair of shoe members 70 outwardly disposed from claw 68. Carriage 62 includes a second set of leaf spring support arms 72 in which a roller 74 is journaled. Support arms 64 and 72 are mounted on a plate 75 by means of a set of screws which extend into plate 75. Carriage 62 is mounted for reciprocal movement across the inside of door 2 by means of a mechanism of the type disclosed in previously mentioned U.S. Ser. No. 46,939 filed of even date herewith. During the reciprocal movement, plate 75 rides on ways 77 which extend across the interior of door 2.

Considering FIGS. 1 and 4–7, various elements are provided for enabling 62 to fulfill its various functions. Film units 30 in FIGS. 4–7 are shown as including a pair of pods 38, 39 as discussed previously, and means are provided for precluding the possibility of premature rupturing of pods 38, 39 on the film units. FIG. 4 is representative of the relative positions of the various elements described thus far immediately after a transparency unit 30' has been exposed. Thus, referring to FIG. 4 with reference to FIG. 1, exposed unit 30' is seated on film gate 11 across the rearward portion of exposure chamber 5, and platen 6 is in its closed position. Cartridge 42 is seated in supply chamber 4 of camera 1, being held in position by springs 60 and 61. Unexposed film units 30 are biased rearwardly by the spring and pressure plate mentioned above, the units being restrained by flanges 50. Carriage 62 is in its initial position behind exposure chamber 5. In order to withdraw a fresh film unit from cartridge 42, it is necessary to transport carriage 62 across exposed film unit 30' and into supply chamber 4. During this displacement of carriage 62, it is desired to rupture pod 38' on exposed unit 30' to initiate the processing thereof, but to prevent the rupturing of pods 38, 39 carried by unexposed film units 30 in cartridge 42. (The means for rupturing pod 39' are not part of the present invention and are not discussed herein.) Therefore, a pair of rails 80 are provided across a portion of the rearward part of front portion 3 of camera 1. Rails 80 include several coplanar sections at various levels, contiguous levels on each rail being connected by ramps. The function of the sections is to control the force exerted by carriage 62 on film units in the camera. Roller 74 includes a central cylindrical portion 82 and end portions 84 having a reduced diameter and adapted to ride on rails 80 in the manner described below to accomplish the precedingly described function.

With the basic elements of the invention now set forth, the operation of this embodiment of the invention will now be described with the intention of thereby completing the description thereof.

After the exposure of film unit 30', platen 6 is closed and latched with its rearward surface extending from film gate 11 and in contact with film element 34. Carriage 62 is urged to the right (referring to FIGS. 4–7) by means of an external control member 85 which is released from a succession of locking positions by means of a slide 87 (FIG. 1). As carriage 62 moves across the rear section of exposure chamber 5, support arms 72 cause roller 74 to exert full pressure on pod 38' of exposed film unit 30' which is firmly supported by platen 6, whereby pod 38' is ruptured. As roller 74 moves across unit 30', the processing solution released from pod 38' is spread across the film element of unit 30' and the processing of the latter is initiated. A pair of rearwardly biased retaining fingers 99 extend into notches 41 and prevent carriage 62 from moving unit 30' towards chamber 4. The taper on fingers 99 renders them ineffective to prevent the movement of unit 30' to the left.

Carriage 62 is urged along its operational path behind supply chamber 4, to thereby engage for subsequent withdrawal a fresh transparency unit 30. To avoid the exertion of rupturing pressure on pods 38, 39. Ramp sections 88 lift roller portions 84 onto sections 90 as carriage 62 proceeds behind supply chamber 4. Thus, portions 84 of roller 74 support the roller when it is aligned with pods 39 as shown in FIG. 5 to prevent the premature rupturing of the pods.

During the displacement of carriage 62 behind supply chamber 4, claws 68 slide across the rearwardmost film unit 30 on opposite sides of element 34. Shoes 70 slide on rails 80 as carriage 62 moves behind supply chamber 4, moving successively along section 90, up ramp 92, and onto section 94. The engagement of shoes 70 with rails 80 controls the pressure exerted by support arms 64 through claws 68 on film units 30. It can be seen in FIG. 5 that the pressure exerted on the stack of film units by claws 68 is great enough to move the stack forwardly and out of engagement with flange 50 shown in the figure.

As carriage 62 completes its movement behind supply chamber 4, claws 68 move between end flange 50 and opposed side flanges 50 of cartridge 42, and across the end of film unit 30 to the position shown in FIG. 6. Sections 90 of rails 80 restrain the forward displacement of roller 74 while the spring in cartridge 42 acts to move the stack of film units 30 in the cartridge rearwardly, thereby causing the rearwardmost unit to engage claws 68. It will be noted that at this time roller 74 is positioned between pods 38, 39.

The various elements are disposed as shown in FIG. 7 when carriage 62 is moved towards its initial position behind exposure chamber 5, with a fresh film unit 30 being pushed by claws 68 out of cartridge 42 and supply chamber 4. As carriage 62 moves to the left, film unit 30, in engagement with claws 68, urges exposed unit 30' from its position on film gate 11 and eventually out of camera 1 through an exit 95 in door 2. If film units 30 are of the type having pod 39, means could be provided for rupturing the pod as the exposed unit is being urged out of the camera. A light seal 93 in exit 95 precludes light leakage into the camera interior when door 2 is closed.

A pair of leaf springs 96 are provided on opposite sides of gate member 11 as shown in FIGS. 1 and 3, for guiding unexposed film units into position for exposure and for resiliently positioning the units in the camera focal plane as shown in FIG. 4. As carriage 62 transports a fresh film unit 30 between a pair of guide surfaces 86 into the exposure position, the film unit is directed by a pair of guide cams 97 and upturned guides 98 beneath springs 96, and retaining fingers 99 enter film unit notches 41. Platen 6 is opened in response to the foregoing movement of carriage 62, and therefore cannot impede the displacement of unit 30 onto gate 11. At the termination of its path, carriage 62 is in its initial position. Roller 74 has moved with the fresh film unit in its position between pods 38 and 39. Roller portion 84 is disengaged from rails 80, and shoes 70 are resting on rail section 90. Therefore, the full pressure of support arm 72 is exerted on film unit 30, now in exposure position, through roller 74. After exposure of the recently transported film unit, the operational cycle explained above is repeated.

It may be seen that the embodiment of the invention described above requires only the displacement of an external control member for moving carriage 62 in its reciprocable path. There is no opportunity for jamming this system by transporting more than one transparency unit into the exposure chamber, and the premature rupturing of pods on the film units is not possible. Although the invention has been described as incorporated in a camera for transporting units from a film supply chamber to an exposure chamber, it could be incorporated in a camera in which a film supply chamber is aligned with the exposure chamber, and exposed film units are to be transported from the exposure chamber to a processing chamber.

The invention has been described in detail with particular reference to the preferred embodiments thereof, but it will be understood that variations and modifications can be effected within the spirit and scope of the invention.

I claim:

1. A camera for exposing and initiating the processing of film units, which film units include a photosensitive portion and at least one rupturable pod containing a processing reagent, said camera comprising:

means defining a first chamber for receiving the film units;
means defining a second chamber for supplying the film units to said first chamber;
a mechanism reciprocably movable between first and second positions associated with said first and second chambers, respectively, for effecting the processing of a film unit in said first chamber, and for transporting the film units from said second chamber to said first chamber, said mechanism including means for rupturing the pod of a film unit in said first chamber in response to the movement of said mechanism from said first position towards said second position, and means for transportably engaging a film unit in said second chamber upon movement of said mechanism to the second position; and,
means for directing said mechanism from said first position to said second position and back to said first position, and for preventing said mechanism from rupturing the pods of the film units in said second chamber, said last-mentioned means including a pair of spaced rails in said second chamber and abutment surfaces on both of said pod rupturing means and said transportably engaging means.

2. A camera according to claim 1, wherein said camera has forward and rearward and upper and lower portions, said mechanism is movable in a plane across the rearward portion of said camera, and said first and second chambers are disposed forwardly of the mechanism, and wherein:
   said pod rupturing means further comprises a roller for exerting force on the film unit and spring means for urging said roller towards the forward portion of said camera; and
   said rails extend along the upper and lower portions of said camera and relieve the force exerted by said spring means toward the forward portion of said camera.

3. A camera according to claim 2 wherein:
   said roller includes a main central portion having a first radius, and coaxially disposed opposing end portions having equal second radii smaller than the first radius; and
   said rails each have a first section and a second section and ramps connecting said sections, said second sections being disposed on the upper and lower edges of said second chamber and defining surfaces disposed rearwardly of said first sections by a distance at least as large as the difference between the radii of said roller portions, said second sections being engageable by said roller end portions when said roller is disposed in rearward alignment with said second chamber to prevent said roller from rupturing pods on film units in said second chamber.

4. A camera according to claim 1 wherein the film units are defined by edge portions; and
   said camera has forward and rearward and upper and lower portions;
   said mechanism is movable in a plane across the rearward portion of the camera; and said first and second chambers are disposed forwardly of the plane and are defined by upper and lower edges;
   said second chamber includes means for positioning a film unit in a predetermined plane generally parallel with the plane of movement of said mechanism; and
   said film-unit-engaging means comprises claw means for engaging an edge portion of a film unit in said second chamber and positioned in the predetermined plane, in response to movement of said mechanism to the second position, and for moving the engaged film unit toward said first chamber in response to the movement of said mechanism from the second position toward the first position.

5. A camera according to claim 4 wherein said mechanism further comprises:
   spring means for exerting force on said claw means to urge said claw means forwardly to facilitate the engagement of said claw means with a film unit in said second chamber; and
   said rails limit the forward displacement of said claw means.

6. A camera according to claim 1 further comprising:
   means defining a support surface at the rearward part of said first chamber; and
   means for guiding a film unit transported from said second chamber towards said first chamber onto said support surface and into engagement with a film unit already on said surface to displace the latter unit from said surface.

7. A camera according to claim 6 wherein:
   said first chamber is an exposure chamber;
   said support surface is a film gate on which film units are sequentially positioned for exposure; and
   said film-unit-guiding means comprises spring means for urging a film unit in said exposure chamber against said film gate.

8. A camera for exposing and initiating the processing of slide transparency units, the units including a photosensitive element and a rupturable pod containing reagents for processing the photosensitive element, said camera having upper and lower, and forward and rearward sections, and comprising:
   a forward portion including:
      an objective lens having a focal plane;
      an exposure chamber extending forwardly in said camera in alignment with said objective lens;
      a film gate at the rear of said exposure chamber, said film-gate-defining a surface for supporting a slide transparency unit in the focal plane of said objective lens;
      a supply chamber adjacent said exposure chamber and extending forwardly in said camera, for supplying unexposed slide transparency units in sequence to said exposure chamber, the rearward part of said supply chamber being defined by upper and lower edges; and
      a pair of parallel rails extending along the upper and lower edges of said supply chamber and defining rearwardly facing coplanar surfaces, said rearwardly facing surfaces being contoured in first, second, and third sections, said rail sections extending increasingly rearwardly from said front portion and being sequentially disposed along the upper and lower edges of said supply chamber;
   a door for closing the rear of said camera;
   a carriage mounted in said door and movable in a linear reciprocable path across said door between a first position to the rear of said exposure chamber and a second position to the rear of said supply chamber; said carriage comprising:
      a roller including a central portion having a first diameter for rupturing the pod of a slide transparency unit in said exposure chamber in response to movement of said carriage from the first position towards the second position; and opposing end portions coaxial with said central portion and having diameters smaller than the first diameter for riding on the second section of said rails when said carriage is behind said supply chamber to prevent said central roller portion from rupturing the pods on slide transparency units in said supply chamber;
      a spring for urging said roller forwardly;
      a pair of claws for engaging a slide transparency unit in said supply chamber in response to the movement of said carriage to the second position, and for transporting the engaged unit towards said exposure chamber in response to the movement of said carriage from the second position towards the first position;
      a pair of shoe members fixed relative to each of said claws for riding on the third section of said rails for placing said claws in position for engaging a slide transparency unit in said supply chamber; and
      a spring for urging said claws and shoe members forwardly; and
   a pair of guide members disposed along the upper and lower portions of the rearward part of said front portion and defining forwardly facing surfaces for seating a slide transparency unit on said film gate, said guide members including rearwardly tapered end sections near said supply chamber for guiding slide transparency units transported from said supply chamber onto said film gate, whereby a slide transparency unit previously seated on said film gate is displaced therefrom.

* * * * *